United States Patent [19]
Gibson

[11] Patent Number: 5,238,293
[45] Date of Patent: Aug. 24, 1993

[54] SHOPPING CART SEAT COVER

[76] Inventor: Donna S. Gibson, 4204 E. 85th St., Tulsa, Okla. 74137-1851

[21] Appl. No.: 941,913

[22] Filed: Sep. 8, 1992

[51] Int. Cl.$^5$ ............................................. A47C 31/00
[52] U.S. Cl. .............................. 297/229; 280/33.993; 297/188; 297/485; 297/DIG. 6
[58] Field of Search .............. 297/188, 219, 229, 250, 297/485, DIG. 6; 280/33.992, 33.993; 224/275; D6/333

[56] References Cited

U.S. PATENT DOCUMENTS

| | | | |
|---|---|---|---|
| 1,538,538 | 5/1925 | Wood | 297/466 X |
| 2,652,183 | 9/1953 | Hlivka | 297/485 X |
| 2,797,743 | 7/1957 | Rodtz, Jr. | 297/229 |
| 3,578,380 | 5/1971 | Jacobus | 297/229 |
| 4,108,489 | 8/1978 | Salzman | 297/37 |
| 4,204,695 | 5/1980 | Salzman | 280/33.993 |
| 4,324,430 | 4/1982 | Dimas, Jr. et al. | 280/33.993 X |
| 4,540,219 | 9/1985 | Klinger | 297/188 X |
| 4,630,863 | 12/1986 | Roberts | 297/219 |
| 4,655,502 | 4/1987 | Houllis | 280/33.993 X |
| 5,161,275 | 11/1992 | Simpson et al. | 297/485 X |

Primary Examiner—Lloyd A. Gall
Attorney, Agent, or Firm—William S. Dorman

[57] ABSTRACT

A cover for the seat of a shopping cart comprising a sheet of double quilted material having a first rectangular panel located at the rear end of the sheet, the bottom surface of the sheet being provided with at least one fastener strip adjacent to the rear edge of the first rectangular panel, the bottom surface of the sheet also being provided with at least one additional fastener strip spaced from the first mentioned fastener strip such that the first rectangular panel can be folded along a line which is located between the first fastener strip and the second fastener strip around the handle of the shopping cart so that the first and second fastener strips can engage one another to hold the first rectangular panel around the handle of the cart, the forward end of the sheet having a second rectangular panel, the sheet having a central panel extending between the first and second rectangular panels, the forward end being provided with an elastic strip, the second rectangular panel being folded downwardly and beneath the central panel along a fold line where the central panel connects with the second rectangular panel, the vertical side edges of the second rectangular panel being stitched to the bottom surface of the central panel, the folded-back and stitched second rectangular panel forming a pocket which is received over a portion of the cart on a pivotal back member that folds away from the handle portion of the shopping cart.

7 Claims, 3 Drawing Sheets

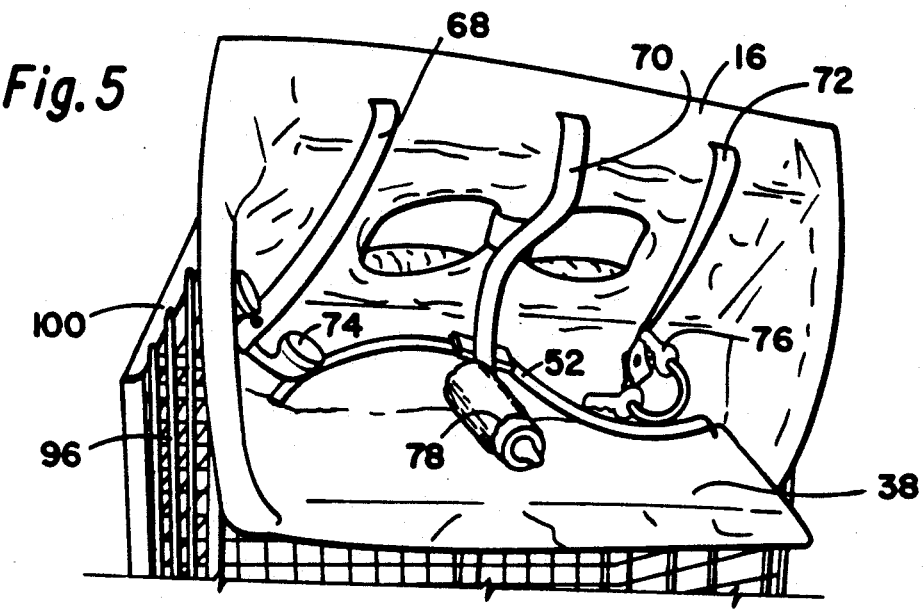
Fig. 5
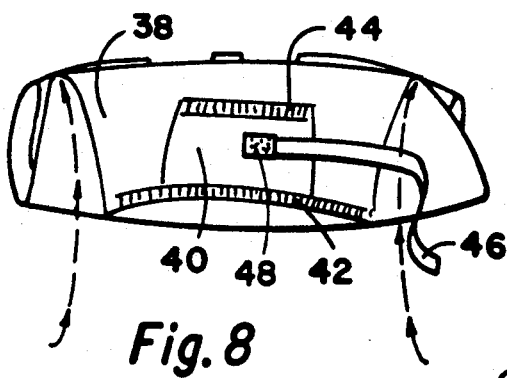
Fig. 6
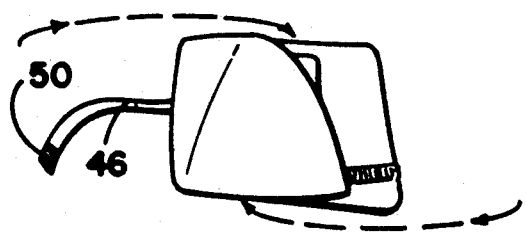
Fig. 7
Fig. 8
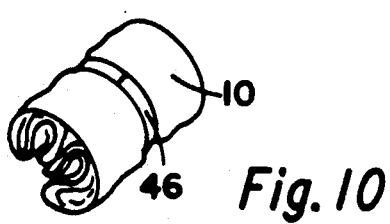
Fig. 9
Fig. 10

SHOPPING CART SEAT COVER

BACKGROUND OF THE INVENTION

1. Field of the Invention

The present invention relates to a cover for a shopping cart seat. More particularly, the present invention relates to such a cover which is placed in the rear seat portion of a conventional shopping cart for the purpose of holding an infant or a small child while preventing direct contact between the infant or child and the cart.

2. The Prior Art

A preliminary search was conducted on the present invention and the following represent the results of the search.

| U.S. Pat. No. | PATENTEE | DATE |
| --- | --- | --- |
| 1,538,538 | Wood | May 19, 1925 |
| 2,652,183 | Hlivka | Sep 15, 1953 |
| 2,797,743 | Rodtz, Jr. | July 2, 1957 |
| 3,578,380 | Jacobus | May 11, 1971 |
| 4,108,489 | Salzman | Aug 22, 1978 |
| 4,324,430 | Dimas, Jr. et al | Apr 13, 1982 |
| 4,416,462 | Thompson | Nov 22, 1983 |
| 4,655,502 | Houllis | Apr 7, 1987 |
| 4,666,207 | Quartano | May 19, 1987 |
| 4,805,937 | Boucher et al | Feb 21, 1989 |

Wood (U.S. Pat. No. 1,538,538) discloses a pad for a child's chair formed by two identical sheets of fabric arranged in superimposed relation and secured together by a row of stitching 5 extending along the marginal edges of the sheets of fabric. The pad defines a back portion with straps hanging from its opposite edges, a bottom portion, and a front portion with a pair of leg holes. Elongated straps 3 extend rearwardly from opposite upper edges of the front portion. There are no side portions.

Hlivka (U.S. Pat. No. 2,652,183) discloses a holder or pad A having a general makeup very similar to the pad of the Wood patent.

Rodtz, Jr. (U.S. Pat. No. 2,797,743) discloses a stroller cover composed of a plurality of sections to form combined seat, back and leg rests.

Jacobus (U.S. Pat. No. 3,578,380) discloses a sanitary cover 31 formed of a sheet of pliable material configured to removably fit the seat of a shopping cart. The sheet has a double back portion 32 slidable onto the back of the shopping cart seat, a center portion fitting the sides, bottom and front of the seat with openings in the front to match the cart seat openings, and an edge portion disposable over the top cart bars and handle. Elastic is stretched about the top edge and ties are provided to hold the cover on the cart seat.

Salzman (U.S. Pat. No. 4,108,489) discloses a child seat structure B having a seat panel 12, back panel 14 and two side restraining flaps 16, 18.

Dimas, Jr. et al (U.S. Pat. No. 4,324,430) discloses a compact chair-like carrier with straps attached to the carrier. The carrier has a frame which includes a pair of upright parallel back bars.

Thompson (U.S. Pat. No. 4,416,462) discloses segmented support pads.

Houllis (U.S. Pat. No. 4,655,502) discloses a foldable seat cushion having a back 21 with a seat belt 28, a front portion which may be rolled about the handle and secured by an adjustable fastener, and a bottom interconnecting the back and front. The front strap has a pair of leg holes 24. The cushion also has tethering straps for holding toys, etc. There are no side portions.

Quartano (U.S. Pat. No. 4,666,207) discloses a foldable seat cushion similar to the seat cushion of the Houllis patent with a different configuration of leg openings.

Boucher et al (U.S. Pat. No. 4,805,937) discloses a foldable seat cover and a separate handle cover 12 for a shopping cart seat.

SUMMARY OF THE INVENTION

The present invention involves a cover for the seat of a shopping cart comprising a sheet of double quilted material having an upper surface, a bottom surface, a rear end, a forward end, and side edges extending from the rear end to the forward end. A first rectangular panel is located at the rear end of the sheet. The cover also includes a central panel having a pair of ears extending outwardly and forming a portion of the side edges of the sheet, an intermediate panel located between the first rectangular panel and the central panel, the first rectangular panel having slightly inclined side edges which bow out to points where the first rectangular panel connects with the intermediate panel, the outwardly projecting ears on the central panel having upper side edges which are essentially horizontal but somewhat curved, the intermediate panel having side edges which extend downwardly and inwardly from the points to the upper edges of the ears and being complimentarily shaped with respect to the upper edges of the ears, the upper edges of the ears being stitched to the side edges of the intermediate panel.

The forward end of the sheet is provided with a second rectangular panel, the side edges of the central panel extending downwardly from the ears and inwardly to merge with the second rectangular panel, the second rectangular panel having vertical side edges and a horizontal edge at the forward end thereof, the forward end being provided with an elastic strip, the second rectangular panel being folded downwardly and beneath the central panel along a fold line where the central panel connects with the second rectangular panel, the vertical side edges of the second rectangular panel being stitched to the bottom surface of the central panel, the intermediate panel having a pair of openings to permit the passage therethrough of the legs of a child, the central panel having a safety seat buckle secured thereto for holding a child in the seat, the bottom surface of the sheet being provided with at least one fastener strip adjacent to the rear edge of the first rectangular panel, the bottom surace of the sheet also being provided with at least one additional fastener strip spaced from the first mentioned fastener strip such that the first rectangular panel can be folded along a line which is located between the first fastener strip and the second fastener strip around the handle of the shopping cart so that the first and second fastener strips can engage one another to hold the first rectangular panel around the handle of the cart, the folded-back and stitched second rectangular panel forming a pocket which is received over a portion of the cart on a pivotal back member that folds away from the handle portion of the shopping cart.

The seat cover also includes a third rectangular panel of smaller size than said second rectangular panel and having a bottom edge, top edge, and vertical side edges, the third rectangular panel being stitched centrally to the upper surface of the second rectangular panel along the side and bottom edges of the third rectangular panel, the upper edge of the third rectangular panel being provided with an elastic strip. A strap is attached to the center of the third rectangular panel, a first piece of fastener mounted on the strap at its point of attachment to the third rectangular panel, the remote end of the strap being provided with a second piece of fastener which will attach to the first piece of fastener when the seat cover is rolled up.

In another modification, the central panel of the seat cover is provided with pockets in the ears for holding magnets therein.

The cover can also be provided with a plurality of straps which connect, at their inner ends, to the seat cover, the outer ends of the straps being provided with means for connection to toys or to a baby bottle.

BRIEF DESCRIPTION OF THE DRAWINGS

FIG. 3 is a perspective view looking from the forward end of a conventional shopping cart towards the rear thereof showing the completed seat cover of FIGS. 1 and 2 in position on the conventional shopping cart and with the bottom panel of the shopping cart being cut off for purposes of clarity;

FIG. 5 is a view similar to FIG. 3 but from a perspective view above the rear of the shopping cart;

FIG. 6 is a view of the completed seat cover in an essentially plan view position and representing the initial position of the seat cover for the purpose of folding the same for storage;

FIG. 7 is a view of the seat cover shown in FIG. 6 representing the second stage of the folding of the seat cover;

FIG. 8 is a view similar to FIG. 7 but showing the next stage of folding of the seat cover;

FIG. 9 is a view showing progression from FIG. 8 involving the next step of folding the seat cover; and FIG. 10 is a view showing the last step in folding of the seat cover and enclosing the same with the external fastener strap.

DETAILED DESCRIPTION OF THE PREFERRED EMBODIMENTS

Figure 1:
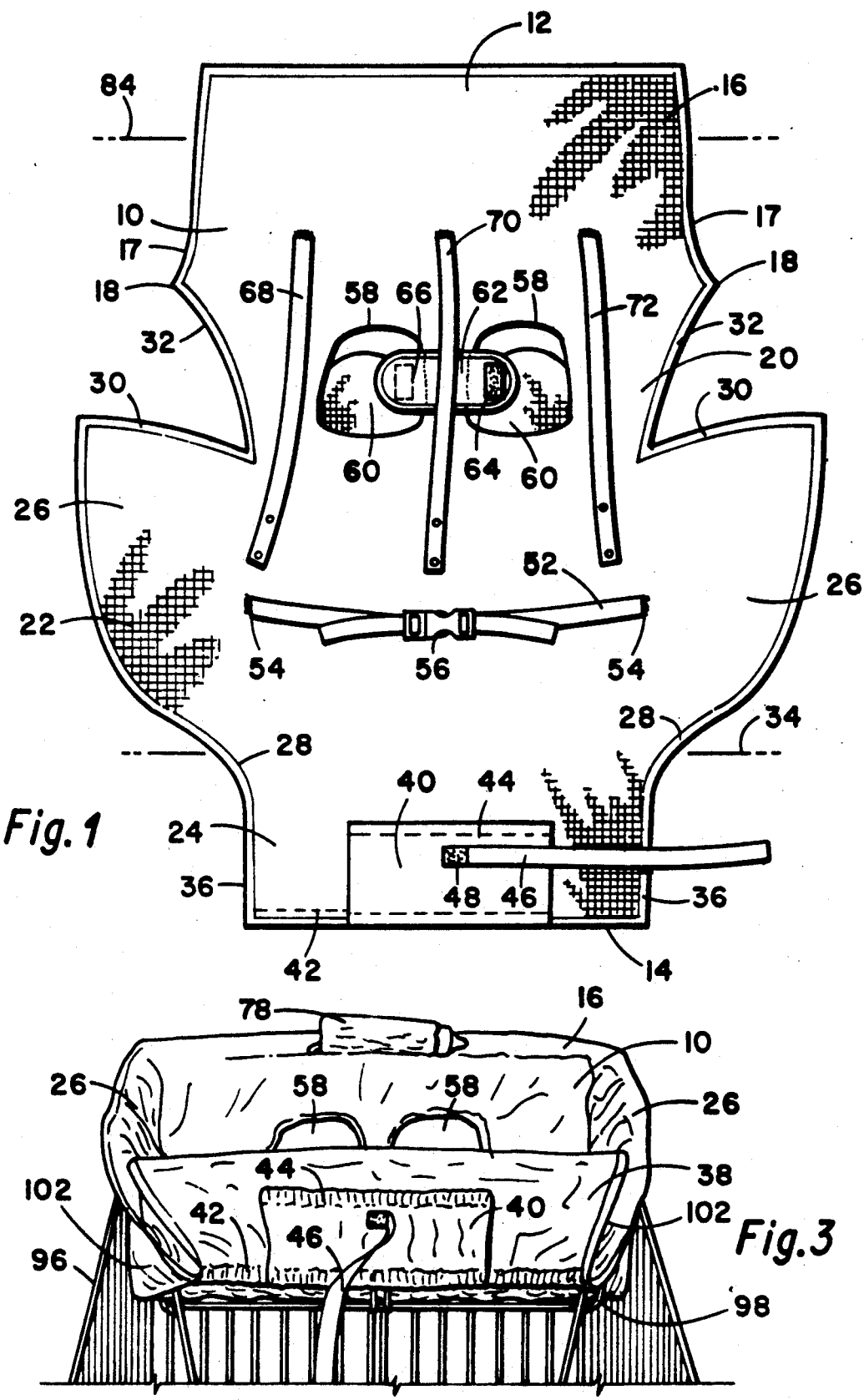
FIG. 1 is a top plan view of a shopping cart seat cover made in accordance with the present invention but showing the same in a flat layout before stitching the side panels and bottom thereof.
Figure 2:
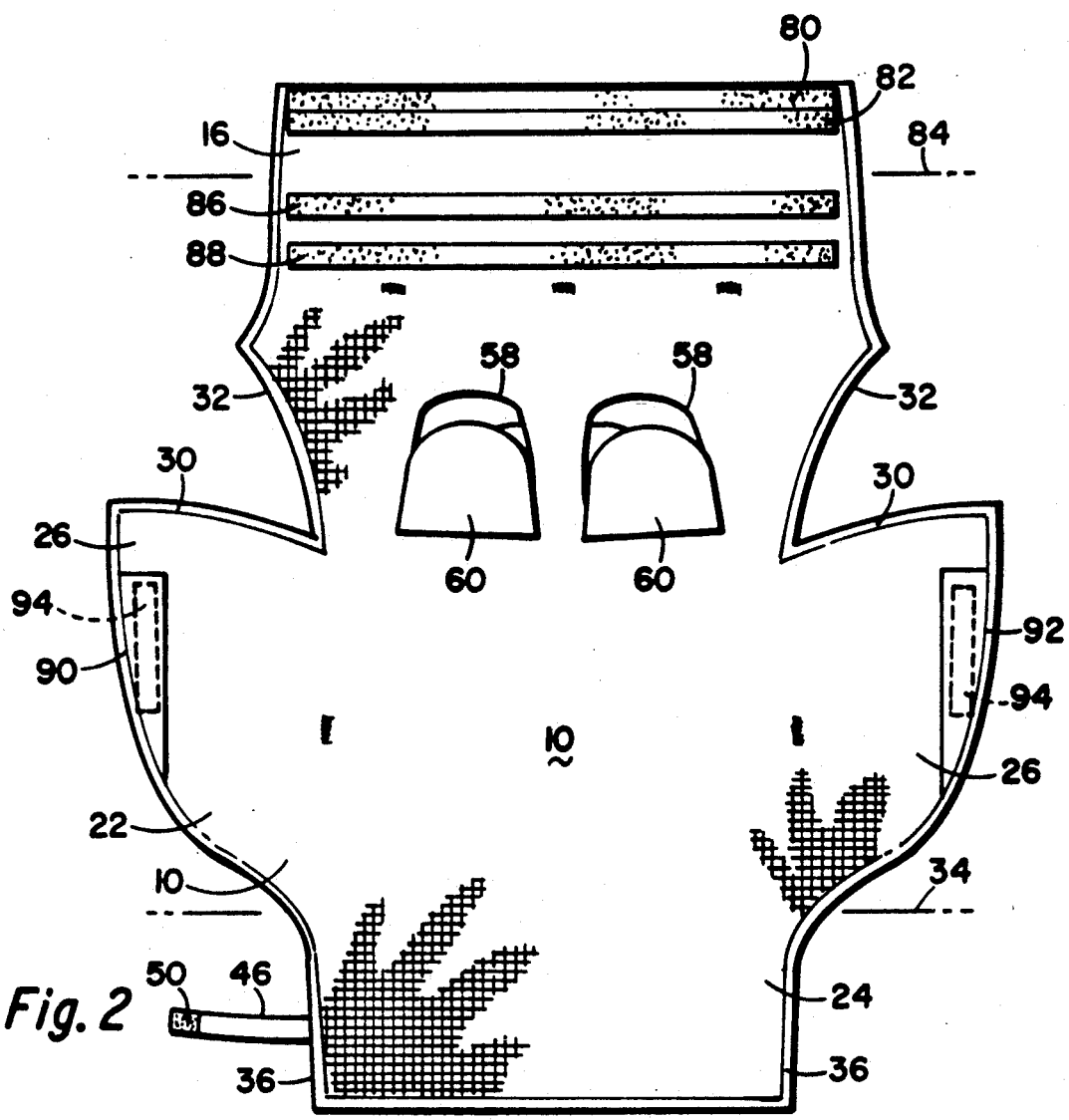
FIG. 2 is a bottom plan view or a reverse view of the seat cover shown in FIG. 1.
Figure 4:
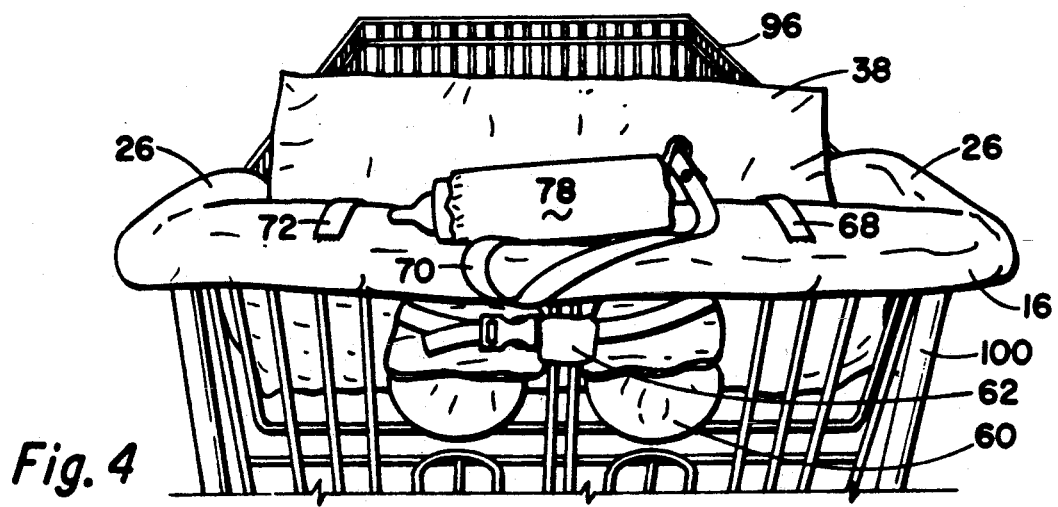
FIG. 4 is a perspective view taken from the rear side of the shopping cart as shown in FIG. 3 and showing the seat cover attached to the shopping cart.

Referring now to FIGS. 1 and 2, the seat cover of the present invention includes a flat sheet 10 of two-sided quilted material, preferably poly-cotton, cut in the shape shown and provided with a stitched edge around the perimeter of the sheet 10. The upper end 12 of the sheet 10 will be referred to as the rear of the sheet 10, or seat cover, while the lower end 14 will be referred to as the forward end of the sheet 10, or seat cover. The panel adjacent the rear end 12 is essentially in the form of a rectangle 16 having slightly inclined sides 17 which bow out slightly to points 18. The sheet 10 also includes an intermediate panel 20 which is located between the panel 16 and an enlarged central panel 22. Below the central panel 22 is a forward rectangular panel 24. The central panel 22 has ears 26 which extend outwardly therefrom for a purpose which will hereinafter appear. The lower portion of the central panel 22 merges with the lower panel 24 by means of curved panels 28.

The upper edge of the central panel 22 is provided with somewhat curved and somewhat horizontal edges 30. The intermediate panel 20 which connects between the upper panel 16 and the central panel 22 is provided with nearly vertical but somewhat curved edges 32 which are complimentarily shaped with respect to the edges 30. When the seat cover 10 is completed, the side edges 30 are sewn to the side edges 32 so that the seat cover 10 becomes cupped upwardly as it would appear in FIG. 1. Also, the lower panel 24 is folded along fold line 34 and folded beneath the central panel 22 after which the side edges 36 of the lower section 24 are stitched to the lower part of the central panel 22 to define an enlarged pocket 38 (see now FIG. 3). A smaller rectangular piece of fabric 40 is sewn on the central lower edge of the lower section 24 to provide a small pocket for a purpose which will hereinafter appear. This rectangular piece 40 is sewn to the section 24 along the side edges of the piece 40 and along the lower edge thereof. A piece of elastic material 42 is sewn along the lower edge of the panel 24 and a shorter piece of elastic material 44 is sewn along the upper end of the rectangular piece 40. A strap 46 is attached to the center of the rectangular piece 40 and is provided with a piece of fastener 48 at its point of attachment to the rectangular piece 40. The remote end of the strap 46 is provided with another piece of fastener 50 for a purpose which will hereinafter appear.

The central panel 22 of the seat is provided with a belt 52. The belt 52 is connected at its ends 54 to the central panel 22 and is provided with a buckle 56. The buckle 56 will be conventional and will be adjustable with respect to the belt so that a child or infant (not shown) can be secured in the seat cover 10 by means of this belt. The intermediate panel 20 is provided with a pair of oblong openings 58 which permit the legs of the child to project out between the openings in the rear end of a shopping cart 96. A pair of flaps 60 are also sewn to the underside (see FIG. 2) of the sheet 10 so that they will overlie a portion of the cart 96 when infant's legs project outwardly through the openings 58.

The conventional shopping cart 96 referred to herein is one which is comprised of a metallic seat which is provided by a pivotal back member which folds away from the rear frame of the shopping cart which includes the handle for pushing the shopping cart at the upper end of this frame member. This metallic seat is completed by a bottom plate which extends between the rear frame member and the pivotal back and which is collapsible when the back is moved to be co-linear with the rear frame member.

An oblong piece of material 62 is attached to the intermediate panel 20 between the two leg openings 58 as best shown in FIG. 1. The upper side is provided with a rectangular piece of fastener 64 and the lower surface is provided with a similar piece of fastener 66. When the cover is positioned over the metallic seat provided by the shopping cart itself and the openings 58 in the cover are aligned with the normal openings of the shopping cart, the oblong piece 62 can be folded over the vertical bar or bars on the cart itself with the fastener rectangle 64 being connected to the fastener rectangle 66.

Three straps 68, 70 and 72 connect, at their inner ends, to the rectangular panel 16 of the seat cover 10. The lower or outer ends of these straps 68, 70 and 72 are provided with snaps for connection to toys 74 or 76 or to a baby bottle 78.

For the purpose of securing the rear end of the seat cover to the cart, the underside or "outside" surface of the cover is provided with a pair of fastener strips 80 and 82 which extend across the full width of the seat cover 10 above a fold line 84. Another pair of fastener strips 86 and 88 extend across the width of the seat cover 10 on the opposite side of the fold line 84. The central panel 22 of the seat cover 10 is provided with pockets 90 and 92 in the ears 26 for holding magnets 94 therein.

When placing the seat cover 10 on the cart 96, the pocket 38, which is formed by the folding and stitching of the rectangular panel 24 to the underside of the central panel 22 is placed over the pivotal back 98 as shown in FIG. 3. Thereafter, the rectangular panel 16 is placed over the handle (not shown) which forms the upper portion of the rear frame 100 of the shopping cart. The fold line 84 will now be directly over the handle of the shopping cart so that the fastener strips 80 and 82 can be folded to engage either or both of the fastener strips 86 or 88.

As shown in FIG. 3, when the seat cover is positioned on the cart as described above, the ears 26 will be positioned over the sides of the cart and the magnets 94 will hold the ears against the sides of the cart. Any excess material such as the portions 102 shown in FIG. 3 can extend forward of the inclined back 98 between the sides of the back 98 and the inner sides of the cart 96; of course, if the back 98 pivots out from the rear frame 100 to a greater extent than shown in the present drawings, the portions 102 will be smaller or entirely eliminated.

Referring now to FIGS. 6 through 10, these figures represent a preferred method of rolling up the seat cover 10. The panel 16 will first have been removed from the handle (not shown) of the cart by disengaging the fastener strips 80 and 82 from the fastener strips 86 and 88 and thereafter re-engaging the same following removal from the handle. The pocket 38 will have been removed from the inclined back of the cart. The rear, folded panel 16 is folded over the central panel 22 to the position shown in FIG. 7. The bottom of the central panel 22 with the pocket 38 behind it is folded up and over the panel 16 as shown in FIG. 8.

From the FIG. 8 position, the entire structure is turned over 180° (degrees) and the panel to the right in FIG. 8 (which would be on the left after turning the fabric over) is folded to the right as shown in FIG. 9. Thereafter, the panel to the right in FIG. 9 is folded to the left and the strap 46 is wound around the folded construction until the fastener end 50 comes into engagement with the fastener end 48 so as to result in the construction shown in FIG. 10.

The fasteners of the present invention are preferably of the type sold under the registered trademark "Velcro".

Whereas, the present invention has been described in particular relation to the drawings attached hereto, other and further modifications, apart from those shown or suggested herein, may be made within the spirit and scope of this invention.

What is claimed is:

1. A cover for the seat of a shopping cart comprising a sheet of double quilted material having an upper surface, a bottom surface, a rear end, a forward end, and side edges extending from the rear end to the forward end, a first rectangular panel located at the rear end of the sheet, a central panel having a pair of ears extending outwardly and forming a portion of the side edges of the sheet, an intermediate panel located between the first rectangular panel and the central panel, the first rectangular panel having slightly inclined side edges which bow out to points where the first rectangular panel connects with the intermediate panel, the outwardly projecting ears on the central panel having upper side edges which are essentially horizontal but somewhat curved, the intermediate panel having side edges which extend downwardly and inwardly from the points to the upper edges of the ears and being complimentarily shaped with respect to the upper edges of the ears, the upper edges of the ears being stitched to the side edges of the intermediate panel, the forward end of the sheet having a second rectangular panel, the side edges of the central panel extending downwardly from the ears and inwardly to merge with the second rectangular panel, the second rectangular panel having vertical side edges and a horizontal edge at the forward end thereof, the forward end being provided with an elastic strip, the second rectangular panel being folded downwardly and beneath the central panel along a fold line where the central panel connects with the second rectangular panel, the vertical side edges of the second rectangular panel being stitched to the bottom surface of the central panel, the intermediate panel having a pair of openings to permit the passage therethrough of the legs of a child, the central panel having a safety seat buckle secured thereto for holding a child in the seat, the bottom surface of the sheet being provided with at least one fastener strip adjacent to a rear edge of the first rectangular panel, the bottom surace of the sheet also being provided with at least one additional fastener strip spaced from the first mentioned fastener strip such that the first rectangular panel can be folded along a line which is located between the first fastener strip and the second fastener strip around a handle of the shopping cart so that the first and second fastener strips can engage one another to hold the first rectangular panel around the handle of the cart, the folded-back and stitched second rectangular panel forming a pocket which is received over a portion of the cart on a pivotal back member that folds away from a handle portion of the shopping cart.

2. A cover for the seat of a shopping cart as set forth in claim 1 which further includes a third rectangular panel of smaller size than said second rectangular panel and having a bottom edge, top edge, and vertical side edges, the third rectangular panel being stitched centrally to the upper surface of the second rectangular panel along the side and bottom edges of the third rectangular panel, the upper edge of the third rectangular panel being provided with an elastic strip.

3. A cover for the seat of a shopping cart as set forth in claim 2 wherein a strap is attached to the center of the third rectangular panel, a first piece of fastener mounted on the strap at its point of attachment to the third rectangular panel, the remote end of the strap being provided with a second piece of fastener.

4. A cover for the seat of a shopping cart as set forth in claim 1 wherein the central panel of the seat cover is provided with pockets in the ears for holding magnets therein.

5. A cover for the seat of a shopping cart as set forth in claim 1 wherein a plurality of straps having inner and outer ends connect, at their inner ends, to the seat cover, the outer ends of the straps being provided with means for connection to toys or to a baby bottle.

6. A cover for the seat of a shopping cart as set forth in claim 1 wherein a pair of flaps are attached to the bottom surface of the cover for overlying portions of the cart to prevent contact between the cart and the legs of a child passing through the pair of openings.

7. A cover for the seat of a shopping cart as set forth in claim 1 wherein an oblong piece of material is attached to the cover between the pair of openings, a rectangular piece of fastener being attached to the upper surface of the oblong piece adjacent one end thereof, and a second rectangular piece of fastener being attached to the bottom surface of the oblong piece at the opposite end thereof.

* * * * *